(12) United States Patent
De Grazia et al.

(10) Patent No.: US 9,637,410 B2
(45) Date of Patent: May 2, 2017

(54) GLASS-CERAMIC

(71) Applicant: EUROKERA S.N.C., Chateau Thierry (FR)

(72) Inventors: Marco De Grazia, Puteaux (FR); Claire Mallet, Montreal (CA)

(73) Assignee: EUROKERA S.N.C., Chateau Thierry (FR)

( * ) Notice: Subject to any disclaimer, the term of this patent is extended or adjusted under 35 U.S.C. 154(b) by 0 days.

(21) Appl. No.: 14/653,635

(22) PCT Filed: Dec. 18, 2013

(86) PCT No.: PCT/FR2013/053153
§ 371 (c)(1),
(2) Date: Jun. 18, 2015

(87) PCT Pub. No.: WO2014/096695
PCT Pub. Date: Jun. 26, 2014

(65) Prior Publication Data
US 2015/0329414 A1 Nov. 19, 2015

(30) Foreign Application Priority Data
Dec. 19, 2012 (FR) ..................................... 12 62286

(51) Int. Cl.
*C03C 17/06* (2006.01)
*C03C 10/00* (2006.01)
*C03C 17/23* (2006.01)
*C03C 17/36* (2006.01)

(52) U.S. Cl.
CPC .......... *C03C 17/06* (2013.01); *C03C 10/0027* (2013.01); *C03C 17/23* (2013.01); *C03C 17/366* (2013.01); *C03C 17/3618* (2013.01); *C03C 17/3626* (2013.01); *C03C 17/3649* (2013.01); *C03C 17/3652* (2013.01); *C03C 17/3668* (2013.01); *C03C 17/3681* (2013.01); *C03C 17/3686* (2013.01); *C03C 2217/259* (2013.01); *C03C 2217/70* (2013.01); *Y10T 428/24975* (2015.01); *Y10T 428/265* (2015.01)

(58) Field of Classification Search
CPC ..... C03C 17/06; C03C 10/0027; C03C 17/23; C03C 17/3668; C03C 17/3626; C03C 17/3618; C03C 17/3652; C03C 17/366; C03C 17/3681; C03C 17/3686; C03C 17/3649; C03C 2217/259; Y10T 428/265; Y10T 428/24975
See application file for complete search history.

(56) References Cited

U.S. PATENT DOCUMENTS

| | | | |
|---|---|---|---|
| 5,965,246 A | 10/1999 | Guiselin et al. | |
| 2002/0192473 A1 | 12/2002 | Gentilhomme et al. | |
| 2005/0079369 A1 | 4/2005 | Stachowiak | |
| 2005/0172829 A1* | 8/2005 | Shimatani | C03C 17/06 99/403 |
| 2006/0172138 A1 | 8/2006 | Stachowiak | |
| 2010/0261009 A1* | 10/2010 | Henn | C03C 17/23 428/335 |
| 2010/0264130 A1 | 10/2010 | Ikegami | |
| 2011/0027554 A1 | 2/2011 | Gouardes et al. | |
| 2011/0146172 A1 | 6/2011 | Mauvernay et al. | |
| 2011/0160033 A1* | 6/2011 | Yamauchi | C03B 18/02 501/69 |
| 2012/0125314 A1* | 5/2012 | Alonso Esteban | C03C 17/36 126/211 |
| 2013/0155496 A1 | 6/2013 | Mauvernay et al. | |

FOREIGN PATENT DOCUMENTS

| | | |
|---|---|---|
| EP | 0 745 569 | 12/1996 |
| EP | 2 226 567 | 9/2010 |
| EP | 2 489 507 | 8/2012 |
| FR | 2 799 005 | 3/2001 |
| FR | 2 927 897 | 8/2009 |
| FR | 2 931 147 | 11/2009 |
| WO | 2005 105687 | 11/2005 |
| WO | 2012 020189 | 2/2012 |

OTHER PUBLICATIONS

International Search Report Issued Aug. 4, 2014 in PCT/FR2013/053153 Filed Dec. 18, 2013.

* cited by examiner

*Primary Examiner* — Laura Auer
(74) *Attorney, Agent, or Firm* — Oblon, McClelland, Maier & Neustadt, L.L.P.

(57) ABSTRACT

A subject matter of the invention is a glass-ceramic sheet provided, on at least a portion of at least one of its faces, with a coating of thin layers comprising at least one thin functional layer composed of a metal based on niobium metal Nb, or of an oxide based on a niobium oxide $NbO_x$ in which x is at most 0.5, the or each thin functional layer being framed by at least two thin layers made of dielectric materials, the physical thickness of the thin functional layer or, if appropriate, the combined physical thickness of all the thin functional layers being within a range extending from 8 to 15 nm.

12 Claims, No Drawings

GLASS-CERAMIC

The invention relates to the field of glass-ceramics used as panels for oven, stove or fireplace doors or windows.

The abovementioned applications require panels exhibiting a high thermomechanical strength, for which glass-ceramics are particularly valued and in particular glass-ceramics of the lithium aluminosilicate (LAS) type, comprising crystals of predominantly β-quartz structure embedded in a residual vitreous phase. This is because the thermal expansion coefficients of these glass-ceramics are virtually zero, hence their excellent impact strength and resistance to thermal gradients.

In addition, it is advantageous, for safety reasons, to be able to reduce as much as possible the temperature of the face of the panel opposite the heat source, in order to avoid excessively great heating of the panel itself but also of the surroundings and thus to prevent burns to the users of the oven, stove or fireplace.

An aim of the invention is to provide panels for oven doors or fireplace inserts which simultaneously exhibit a high thermomechanical strength, properties of limiting the temperature on the face opposite the face turned toward the heat source and also acceptable optical properties, in particular in terms of light reflection and transmission. In the abovementioned applications, the panel must also withstand corrosive atmospheres, with the result that excellent chemical resistance is required.

To this end, a subject matter of the invention is a glass-ceramic sheet provided, on at least a portion of at least one of its faces, with a coating of thin layers comprising at least one thin functional layer composed of a metal based on niobium metal Nb, or of an oxide based on a niobium oxide $NbO_x$ in which x is at most 0.5, the or each thin functional layer being framed by at least two thin layers made of dielectric materials, the physical thickness of the thin functional layer or, if appropriate, the combined physical thickness of all the thin functional layers being within a range extending from 8 to 15 nm.

Another subject matter of the invention is an oven, stove or fireplace door or window comprising at least one glass-ceramic sheet according to the invention. Finally, a subject matter of the invention is an oven, a stove or a fireplace comprising at least one door or window according to the invention.

The or each thin functional layer is either composed of a metal based on niobium metal Nb or composed of an oxide based on a niobium oxide $NbO_x$ in which x is at most 0.5. The expression "based on" is understood to mean that the metal or the oxide making up the or each thin functional layer preferably comprising at least 80% by weight, in particular 90% by weight, according to the case of niobium metal or of $NbO_x$. The thin functional layer can optionally comprise other metals than Nb, to a minor extent, in particular at least one metal chosen from Zr, Ti, Ta and Mo.

Preferably, however, the or each thin functional layer is composed of niobium metal Nb or is composed of an niobium oxide $NbO_x$ in which x is at most 0.5.

The or each thin functional layer can be composed of niobium metal. Functional layers of this type, in combination with the dielectric layers, have proven to be particularly effective both in terms of thermal and in terms of thermomechanical and chemical resistance.

The or each thin functional layer can alternatively be composed of oxide $NbO_x$ where x is at most 0.5, in particular 0.4, preferably within a range extending from 0.05 to 0.35, in particular from 0.25 to 0.30. The value of x can be determined using the depth profiles of the stacks by the XPS (X-ray photoelectron spectrometry) method, by integration of the respective Nb and O peaks, according to well known techniques specific to this analytical method. The measurement is carried out at the maximum intensity of the signal of the niobium, corresponding to the center of the functional layer. Typically, the experimental conditions of the measurement carried out can be as follows. The XPS depth profiles are acquired using a Novae spectrometer distributed by Kratos. The XPS spectra are collected using the $K_{alpha}$ excitation of aluminum (hv=1486.6 eV) of 225 W. The scale of the binding energies is corrected for the charging effects by applying the binding energy of the Cls (CH—aliphatic carbons) electrons at 285 eV. The abrasion source is an $Ar^+$ ion gun operating at 2 keV with an intensity of 1.15 µA scanning a field of 3×3 $mm^2$ (these operating conditions resulting in an abrasion rate corresponding to 3.4 nm/mm in the silica). The analytical region (collection of the photoelectrons) is a rectangle having dimensions of 300×700 $µm^2$. The takeoff angle is 90° with respect to the surface of the sample.

An alternative way of characterizing the oxygen content of the $NbO_x$ layer uses the technique known as SIMS (Secondary Ion Mass Spectrometry). This method consists in bombarding, with a beam of ions, the surface of the stack to be analyzed. The sample is sputtered and a portion of the sputtered material is ionized. The "secondary" ions are accelerated toward a mass spectrometer which will make it possible to measure the elemental, isotopic or molecular composition of the surface of the sample. More specifically, the experimental conditions of the measurement carried out can be defined below. The depth profiles of the stacks are obtained using a TOF SIMS 5 device from IONTF. The profile of the secondary ions is obtained by using, as source of primary ions, $Bi_3^{2+}$ ions at 60 keV with a pulsed current of 0.3 pA (with a pulse of 7 ns and a cycle time of 100 microseconds) and, as abrading entities, $Cs^+$ ions at 1 keV with a pulsed current of 50 nA. The sputtered surface is a square with a side length of 200 micrometers. The region analyzed is a square with a side length of 50 micrometers centered on the bottom of the crater. An electron gun is used to neutralize the surface, so as to reduce the charging effects. The oxygen content of the $NbO_x$ layer can be characterized by the ratio of NbO/Nb signals, the measurement corresponding to the ratio of the integrated areas of the NbO and Nb signals over the portion of the SIMS profiles for which the intensity of the Nb signal is significant (nonzero). Preferably, the functional layer composed of an oxide based on niobium oxide $NbO_x$ is characterized by an NbO/Nb ratio within a range extending from 1.0 to 3.5, in particular from 1.8 to 2.8 and even from 2.1 to 2.5. This way of characterizing the oxygen content is an alternative to that using the measurement of x by the XPS technique.

The physical thickness of the thin functional layer or, if appropriate, the combined physical thickness of all the thin functional layers is within a range extending from 8 to 15 nm, preferably from 9 to 14 nm and even from 10 to 13 nm. This is because excessively low thicknesses do not make it possible to achieve the desired thermal performance. Conversely, excessively high thicknesses unacceptably reduce the light transmission of the sheet.

Preferably, the coating comprises only one thin functional layer, in particular composed of niobium metal. The coating advantageously comprises only two thin layers of dielectric material framing the single thin functional layer. Simple stacks of this type have proved to be satisfactory and much easier to produce industrially than a stack comprising several functional layers and consequently at least three layers of dielectric material.

The dielectric materials, which are identical or different, are preferably chosen from oxides, nitrides or oxynitrides of silicon, aluminum, titanium, zirconium, tin, zinc or any one of their mixtures or solid solutions.

The dielectric materials, which are identical or different, are preferably based on or essentially composed (indeed even composed) of silicon nitride, titanium oxide, titanium zirconium oxide, zinc tin oxide, titanium silicon nitride, silicon zirconium nitride or silicon oxide. The expression "based on" is understood to mean that the material preferably comprises at least 80% by weight, indeed even 90% by weight, of the compound in question.

Among these, silicon nitride is particularly valued for its ability to efficiently protect the functional layer and to be rapidly deposited by magnetron cathode sputtering. The silicon nitride is not necessarily stoichiometric in nitrogen (even if, for reasons of simplicity, it may be referred to as $Si_3N_4$ in the continuation of the text). The silicon nitride can be doped, for example with aluminum, in order to facilitate its deposition by DC magnetron cathode sputtering. This is because the doping of the silicon target, generally with from 2 atom % to 10 atom % of aluminum, makes it possible to improve the conducting properties of the target. Titanium oxide has also proven to be a good dielectric material, in particular by virtue of its high refractive index.

The physical thickness of each layer of dielectric material is preferably within a range extending from 10 to 100 nm, in particular from 20 to 80 nm. It is advantageously adjusted so as to optimize the optical properties of the stack, in particular its light transmission and its light reflection.

Preferably, a thin layer of blocker is located above and in contact with and/or below and in contact with the or each thin functional layer. As is usual in the field of thin layers, the term "above" is understood to mean a position more distant from the substrate. The blocker layers are intended to prevent the decomposition of the functional layer when it is used at high temperature.

When at least one of the layers of dielectric materials is based on a nitride or an oxynitride, for example silicon nitride, it has been observed that the functional layer can be nitrided during a heat treatment, for example during the use of the panel in an oven, a stove or a fireplace, and that this nitridation has the effect of damaging the thermal performance of the panel. The interposition of a blocker layer between the functional layer and each layer of dielectric material, in particular of nitride or oxynitride (such as silicon nitride), has thus proved to be advantageous. Consequently, in particular when the layers of dielectric material are both made of nitride or oxynitride, and particularly of silicon nitride, it is preferable to position at least two blocker layers, respectively below and above the functional layer, in contact with the latter.

Likewise, when at least one of the layers of dielectric materials is based on an oxide or an oxynitride, the functional layer can oxidize in an excessively great way and experience a deterioration in its properties. In this case also, it is preferable to position a blocker layer between the functional layer and each layer of dielectric material.

The or each thin blocker layer is preferably made of titanium. Other metals or alloys, indeed even oxides or nitrides, are possible, in particular NiCr, Mo, B, Al, TiNi, TiN or $TiO_x$, but titanium has proved to be the most effective, in particular in preventing the nitridation of the niobium by dielectric layers made of nitride or oxynitride.

The physical thickness of or each thin blocker layer (in particular made of titanium) is preferably at most 3 nm, in particular 2 nm. It is generally at least 0.5 nm or 1 nm. This is because very low thicknesses are sufficient in order to obtain the effect of blocking the nitrogen ions, whereas high thicknesses will contribute to greatly reducing the light transmission of the panel.

The following stacks are preferred:
i. V/D/Nb/D
ii. V/D/B/Nb/D
iii. V/D/Nb/B/D
iv. V/D/B/Nb/B/D.

V denotes the sheet of glass-ceramic, D the dielectric material (for example made of silicon nitride or based on this material), Nb the thin functional layer (in particular of Nb metal or $NbO_x$) and B the blocker layer (preferably made of titanium). The dielectrics D and the blockers B can be identical or different and will preferably be identical in order to simplify the industrial production of the stack. The various preferred forms described above, whether preferred in terms of choice of materials or of choice of thicknesses, are, of course, applicable to these preferred stacks, not all the combinations being expressly indicated here for reasons of conciseness.

The stack i) does not comprise any blocker B. It is particularly suitable for the case where the materials of the layers D are not nitrides or oxynitrides.

The stacks ii) and iii) comprise only a single blocker B, respectively below and above the functional layer. These stacks are particularly suitable for the case where just one of the dielectric layers D is made of nitride or oxynitride, in this case that which the blocker B separates from the functional layer.

The stack iv) comprises two blockers, in particular made of titanium. In this case, the dielectric layers D are preferably both made of silicon nitride or based on this material. A particularly preferred stack is thus the stack $V/Si_3N_4/Ti/Nb/Ti/Si_3N_4$, the term "$Si_3N_4$" not being prejudicial to the true stoichiometry of the layer and a possible doping, in particular by aluminum, as explained above.

The glass-ceramic sheet preferably exhibits a light reflection factor of at most 15%, in particular 13%, and/or a light transmission factor of at least 40%, in particular 50%, within the meaning of the standard EN 410:1998.

The reflection for a wavelength of 3 micrometers is advantageously at least 50%, in order to limit transfers of heat through the panel.

The glass-ceramic preferably has a composition of lithium aluminum silicate (LAS) type and comprises crystals of β-quartz structure.

More specifically, the chemical composition of the glass-ceramic preferably comprises the following constituents within the limits defined below, expressed as percentages by weight:

$SiO_2$ 52-75%, in particular 65-70%
$Al_2O_3$ 18-27%, in particular 18-19.8%
$Li_2O$ 2.5-5.5%, in particular 2.5-3.8%
$K_2O$ 0-3%, in particular 0-<1%
$Na_2O$ 0-3%, in particular 0-<1%
ZnO 0-3.5%, in particular 1.2-2.8%
MgO 0-3%, in particular 0.55-1.5%
CaO 0-2.5%, in particular 0-0.5%
BaO 0-3.5%, in particular 0-1.4%
SrO 0-2%, in particular 0-1.4%
$TiO_2$ 1.2-5.5%, in particular 1.8-3.2%
$ZrO_2$ 0-3%, in particular 1.0-2.5%
$P_2O_5$ 0-8%, in particular 0-0.5%.

The glass-ceramic is preferably transparent and colorless, with the result that it does not normally comprise coloring agents, with the exception of iron oxide impurities naturally present in several starting materials. It thus preferably does not comprise vanadium oxide, cobalt oxide, chromium oxide, nickel oxide, copper oxide, or selenium or sulfides. According to some embodiments and in order to vary its coloration, the glass-ceramic can, however, comprise at least one coloring agent, in particular cobalt oxide.

The composition generally comprises oxides which have been used to refine the glass during its production, for example $SnO_2$, $As_2O_5$ or $Sb_2O_5$, or also sulfides, such as ZnS.

The linear thermal expansion coefficient (between 30 and 200° C.) of the glass-ceramic sheet is preferably at most $15.10^{-7}$/° C., indeed even $5.10^{-7}$/° C.

The glass-ceramic can be produced by known processes, by melting glass (known as mother glass or precursor glass), forming a sheet of mother glass by the float glass or rolling process, followed by the ceramization of this sheet of mother glass, in order to bring about the growth within it of the desired crystals, in particular of β-quartz structure, and to thus obtain the glass-ceramic. The ceramization generally employs a multistage heat treatment according to a cycle intended to create seeds within the glass (nucleation at approximately from 670 to 800° C.) and then to bring about the growth of the crystals around these seeds (at approximately from 900 to 1000° C.)

The thickness of the glass-ceramic sheet will generally be within a range extending from 2 to 8 mm, in particular from 3 to 6 mm.

The coating can subsequently be deposited by various techniques, for example chemical vapor deposition (CVD), optionally plasma-enhanced (PECVD) and in particular at atmospheric pressure (APPECVD), combustion chemical vapor deposition (CCVD) or sol-gel processes.

The preferred deposition technique is magnetron cathode sputtering, in particular with polarization of the target under direct current (DC). This vacuum technique makes it possible to deposit complex stacks with high deposition rates. In this process, the substrate will progress forward in vacuum chambers, facing metal or ceramic targets sputtered by a plasma, the atoms torn off from the target being deposited on the substrate. The deposition can be reactive (for example by depositing silicon nitride from a target made of silicon—generally doped with aluminum, as explained above—in an atmosphere comprising nitrogen). When the functional layer is composed of niobium metal, use is typically made of a niobium target and an argon plasma. When the functional layer is composed of $NbO_x$, use will preferably be made of a niobium target and an argon plasma comprising a small amount of oxygen, for example between 1% and 5% and in particular between 2% and 5% by volume. The deposition of the coating is carried out on the glass-ceramic and not on the mother glass as the very high temperatures undergone during the ceramization treatment and also the mechanical stresses undergone as a result of the compaction of the mother glass are liable to damage the stack of thin layers.

The glass-ceramic thus coated can subsequently be cut up, shaped and optionally enameled, in order to be fitted to an oven, stove or fireplace door or window.

The oven door (generally a domestic oven, typically a pyrolytic oven) preferably comprises from 2 to 4 transparent panels, the glass-ceramic sheet according to the invention preferably being the sheet closest to the internal chamber of the oven.

In such a configuration but also in the case of a stove or of a fireplace, the functional layer can be turned toward the inside of the chamber (reflecting the heat toward the chamber) or toward the outside of the chamber (in order to reduce the emission of heat by the external surface). The reduction in the energy losses brings about an increase in the efficiency of the ovens, stoves and fireplaces, while reducing the temperature of the door or of the window and the temperature of its close surroundings. In addition, the positioning of the functional layer toward the outside of the chamber facilitates the pyrolysis of the soot and soiling substances deposited in said chamber.

The examples which follow illustrate the invention without limiting it.

According to a first example (example 1), a stack composed of the following layers: a dielectric layer of silicon nitride (60 nm), then a titanium blocker (1 nm), then a functional niobium layer (10 nm), then a titanium blocker (1 nm) and finally a dielectric layer of silicon nitride (60 nm), was deposited on a clear glass-ceramic sold under the Keralite brand by the applicant company. The thicknesses are physical thicknesses. The glass-ceramic used is a glass-ceramic of the LAS type comprising crystals of β-quartz structure and a vitreous phase as minor component.

All the layers were deposited in a known way by DC magnetron cathode sputtering, the titanium and niobium layers being deposited from targets respectively of titanium and niobium under an argon plasma and the silicon nitride layers being deposited from targets of silicon (doped with 8 atom % of aluminum) under an atmosphere of argon and nitrogen.

The light transmission factor obtained is 51.0% and the light reflection factor is only 3.4%. The reflection for a wavelength of 3 micrometers is greater than 50%.

Example 2 differs from the first in that the physical thickness of the niobium layer is 13 nm. In this case, the light transmission factor is 44.0% and the light reflection factor is 4.2%. The reflection for a wavelength of 3 micrometers is also much greater than 50%.

In the case of examples 1 and 2, the reflection at 3 micrometers is unchanged after a heat treatment at 550° C. for 60 h and no defect visible to the naked eye is observed.

Example 3 differs from example 1 in that the blockers made of titanium are replaced by blockers made of alloy of nickel and chromium, which are also deposited by magnetron cathode sputtering.

Example 4 differs from the above in that the blocker located above the niobium layer is dispensed with.

Example 5 differs from example 1 in that the blocker located above the niobium layer is dispensed with.

In the case of examples 3 to 5, the reflection at 3 micrometers is greater than 50% after deposition of the coating but falls to approximately 30% after a heat treatment at 550° C. These examples are thus less preferred and illustrate both the advantage of positioning a blocker on each side of the niobium layer and the superiority of the titanium.

Examples 6 to 11 reproduce example 1, except that the dielectric materials and their thicknesses are different. In addition, the thickness of the niobium layer is 13 nm. Finally, these stacks do not comprise blockers. The materials tested are silicon and zirconium nitride, silicon oxide, titanium oxide, titanium zirconium oxide, zinc tin oxide and silicon nitride.

The various tests carried out are collated in table 1 below, which shows the nature and the physical thickness of the dielectric layer located under the functional layer (known as "dielectric 1"), the nature and the physical thickness of the dielectric layer located on the functional layer (known as "dielectric 2"), the light transmission factor (known as LT), the light reflection factor (known as LR) and the reflection for a wavelength of 3 μm. As in the whole of the text, the designation of the layers is not prejudicial to their exact stoichiometry and/or to the presence of minor elements, such as dopants.

TABLE 1

|  | Dielectric 1 | Dielectric 2 | LT (%) | LR (%) | R, 3 μm (%) |
|---|---|---|---|---|---|
| 6 | $SiZrN_x$ (60 nm) | $SiZrN_x$ (60 nm) | 50 | 4 | >50 |
| 7 | $SiO_2$ (85 nm) | $SiO_2$ (85 nm) | 35 | 7 | >50 |
| 8 | $TiO_2$ (50 nm) | $TiO_2$ (50 nm) | 45 | 7 | >50 |
| 9 | $TiZrO_x$ (50 nm) | $TiZrO_x$ (50 nm) | 48 | 10 | >50 |
| 10 | $SnZnO_x$ (60 nm) | $SnZnO_x$ (60 nm) | 48 | 4 | >50 |
| 11 | $Si_3N_4$ (60 nm) | $SnZnO_x$ (60 nm) | 48 | 4 | >50 |

The invention claimed is:

1. An oven, stove or fireplace door comprising a glass-ceramic sheet, comprising, on at least a portion of at least one of its faces, a coating of layers comprising at least one functional layer comprising a niobium metal Nb or a niobium oxide $NbO_x$ in which x is at most 0.5, the at least one functional layer being framed by at least two layers comprising at least one dielectric material, wherein a thickness of the functional layer or a combined thickness of all functional layers ranges from 8 to 15 nm,
wherein the glass-ceramic sheet exhibits a light reflection factor of at most 15%, and a light transmission factor of at least 40%, within the meaning of the standard EN 410:1998.

2. The oven, stove or fireplace door of claim 1, wherein the at least one functional layer consists of a niobium metal.

3. The oven, stove or fireplace door of claim 1, wherein the coating comprises only one functional layer.

4. The oven, stove or fireplace door of claim 1, wherein the dielectric materials, which are identical or different, are chosen from oxides, nitrides or oxynitrides of silicon, aluminum, titanium, zirconium, tin, zinc or any one of their mixtures or solid solutions.

5. The oven, stove or fireplace door of claim 1, wherein the dielectric materials, which are identical or different, comprise silicon nitride, titanium oxide, titanium zirconium oxide, zinc tin oxide, titanium silicon nitride, silicon zirconium nitride or silicon oxide.

6. The oven, stove or fireplace door of claim 1, wherein a thickness of each layer of dielectric material ranges from 10 to 100 nm.

7. The oven, stove or fireplace door of claim 1, wherein a layer of blocker is located above and in contact with and/or below and in contact with the at least one functional layer.

8. The oven, stove or fireplace door of claim 7, wherein each layer of blocker consists of titanium.

9. The oven, stove or fireplace door of claim 7, wherein a thickness of each layer of blocker is at most 3 nm.

10. The oven, stove or fireplace door of claim 1, exhibiting a reflection of at least 50% for a wavelength of 3 micrometers.

11. The oven, stove or fireplace door of claim 1, wherein the glass-ceramic sheet is a lithium aluminosilicate glass-ceramic sheet and comprises crystals of β-quartz structure.

12. The oven, stove or fireplace door of claim 11, wherein the glass-ceramic sheet has a chemical composition comprising the following constituents within the limits defined below, expressed as percentages by weight:

$SiO_2$ 52-75%;
$Al_2O_3$ 18-27%;
$Li_2O$ 2.5-5.5%;
$K_2O$ 0-3%;
$Na_2O$ 0-3%;
ZnO 0-3.5%;
MgO 0-3%;
CaO 0-2.5%;
BaO 0-3.5%
SrO 0-2%;
$TiO_2$ 1.2-5.5%;
$ZrO_2$ 0-3%; and
$P_2O_5$ 0-8%.

* * * * *